United States Patent
Chopko et al.

(10) Patent No.: US 10,830,521 B2
(45) Date of Patent: Nov. 10, 2020

(54) REFRIGERATION UNIT HAVING MOVABLE DIRECTIONAL ELEMENT

(71) Applicant: Carrier Corporation, Palm Beach Gardens, FL (US)

(72) Inventors: Robert A. Chopko, Baldwinsville, NY (US); Michael Balistreri, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 171 days.

(21) Appl. No.: 16/098,186

(22) PCT Filed: Apr. 20, 2017

(86) PCT No.: PCT/US2017/028588
§ 371 (c)(1),
(2) Date: Nov. 1, 2018

(87) PCT Pub. No.: WO2017/192277
PCT Pub. Date: Nov. 9, 2017

(65) Prior Publication Data
US 2019/0145690 A1    May 16, 2019

Related U.S. Application Data

(60) Provisional application No. 62/331,757, filed on May 4, 2016.

(51) Int. Cl.
*F25D 11/00*    (2006.01)
*B60H 1/00*    (2006.01)
(Continued)

(52) U.S. Cl.
CPC ............ *F25D 11/003* (2013.01); *B23P 15/26* (2013.01); *B60H 1/00014* (2013.01);
(Continued)

(58) Field of Classification Search
CPC ........................... F25D 11/003; F25D 19/003
See application file for complete search history.

(56) References Cited

U.S. PATENT DOCUMENTS 2,756,564 A    7/1956  Robertson
5,161,848 A    11/1992 Lutton
(Continued)

FOREIGN PATENT DOCUMENTS

EP    1001232 A2    5/2000
EP    1961611 A2    8/2008
(Continued)

OTHER PUBLICATIONS

Miyagawa JP200500063A English translation (Year: 2005).*
(Continued)

*Primary Examiner* — Jason L Vaughan
*Assistant Examiner* — Amanda Kreiling
(74) *Attorney, Agent, or Firm* — Cantor Colburn LLP (57) ABSTRACT

A refrigeration unit for a vehicle comprising a condenser configured to be positioned outside of the vehicle, an evaporator in thermal communication with the condenser and configured to be positioned inside of a cargo space of the vehicle, the evaporator having a fan, and a movable directional element housed within the evaporator and deployable from a first position to a second position, wherein in the first position, the movable directional element is stowed within the evaporator and in the second position the movable directional element provides directional airflow control to air being blown by the fan of the evaporator.

20 Claims, 12 Drawing Sheets

(51) Int. Cl.
  *F25D 19/00* (2006.01)
  *B60H 1/32* (2006.01)
  *B23P 15/26* (2006.01)
  *F25B 13/00* (2006.01)
  *B60P 3/20* (2006.01)

(52) U.S. Cl.
  CPC ........... *B60H 1/3229* (2013.01); *F25B 13/00* (2013.01); *F25D 19/003* (2013.01); *B60P 3/20* (2013.01)

(56) References Cited

U.S. PATENT DOCUMENTS

| | | | |
|---|---|---|---|
| 5,704,676 | A | 1/1998 | Hill |
| 5,769,704 | A | 6/1998 | Henning et al. |
| 5,927,090 | A | 7/1999 | Ladendorf et al. |
| 6,116,044 | A | 9/2000 | Gothier |
| 6,279,334 | B1 | 8/2001 | Ishikawa et al. |
| 7,614,242 | B1 * | 11/2009 | Quesada Saborio ............... B60H 1/3232 62/298 |
| 8,794,187 | B2 | 8/2014 | Smith et al. |
| 9,228,772 | B1 | 1/2016 | Quesada |
| 2009/0320514 | A1 | 12/2009 | Clark et al. |
| 2010/0251753 | A1 | 10/2010 | Thogersen et al. |
| 2012/0198866 | A1 | 8/2012 | Zeidner |
| 2015/0202945 | A1 | 7/2015 | Bushnell et al. |

FOREIGN PATENT DOCUMENTS

| | | |
|---|---|---|
| JP | H1123139 A | 1/1999 |
| JP | 2005300063 A * | 10/2005 |
| JP | 2005300063 A | 10/2005 |
| WO | 2011055163 A1 | 5/2011 |

OTHER PUBLICATIONS

International Search Report, International Application No. PCT/US2017/028588, dated Aug. 2, 2017, European Patent Office; International Search Report 4 pages.

International Written Opinion, International Application No. PCT/US2017/028588, dated Aug. 2, 2017, European Patent Office; International Written Opinion 5 pages.

Tassou, et al.; "Food Trasport Refrigeration"; Jan. 2008; Internet; URL: http://www.grimsby.ac.uk/documents/defra/trns-refrigeenergy.pdf; 25 pgs.

* cited by examiner

REFRIGERATION UNIT HAVING MOVABLE DIRECTIONAL ELEMENT

CROSS REFERENCE TO RELATED APPLICATIONS

This is a U.S. National Stage of International Application No. PCT/US2017/028588, filed on Apr. 20, 2017, which claims the benefit of U.S. Provisional Patent Application No. 62/331,757, filed on May 4, 2016, the disclosures of which are incorporated herein by reference.

BACKGROUND

The subject matter disclosed herein generally relates to refrigeration units for vehicles and, more particularly, to refrigeration units having movable direction elements for vehicles.

Cooling systems in vehicles may be configured with cooling systems, such as refrigeration units, that are set up for providing cooling within a cargo space. Some refrigeration units may be removably installable through opening in walls of the vehicle. These units may be relatively small and manually installable. The refrigeration units may be configured with blowers or fans that direct air within the cargo space. When using such refrigeration units, the air may be blown upward within the cargo space toward the roof or ceiling, and the air is then distributed into the cargo space because the ceiling provides a flow surface along which the air may flow.

SUMMARY

According to one embodiment, a refrigeration unit for a vehicle is provided. The refrigeration unite includes a condenser configured to be positioned outside of the vehicle, an evaporator in thermal communication with the condenser and configured to be positioned inside of a cargo space of the vehicle, the evaporator having a fan, and a movable directional element housed within the evaporator and deployable from a first position to a second position, wherein in the first position, the movable directional element is stowed within the evaporator and in the second position the movable directional element provides directional airflow control to air being blown by the fan of the evaporator.

In addition to one or more of the features described above, or as an alternative, further embodiments of the refrigeration unit may include that the movable directional element includes the fan of the evaporator.

In addition to one or more of the features described above, or as an alternative, further embodiments of the refrigeration unit may include a pivot configured to enable the movable directional element to pivot from the first position to the second position.

In addition to one or more of the features described above, or as an alternative, further embodiments of the refrigeration unit may include a support operationally connected to the movable directional element, the support configured to releasably support the movable directional element in the second position.

In addition to one or more of the features described above, or as an alternative, further embodiments of the refrigeration unit may include a fastener configured to removably attach the movable directional element in the second position to a structure of the vehicle.

In addition to one or more of the features described above, or as an alternative, further embodiments of the refrigeration unit may include that the movable directional element defines a directional surface configured to direct air in a predefined direction.

In addition to one or more of the features described above, or as an alternative, further embodiments of the refrigeration unit may include an additional fan within the evaporator.

In addition to one or more of the features described above, or as an alternative, further embodiments of the refrigeration unit may include an attachment device configured to attach to the evaporator and direct airflow from the evaporator into the cargo space.

In addition to one or more of the features described above, or as an alternative, further embodiments of the refrigeration unit may include that the attachment device includes at least one of a directional surface and a duct.

In addition to one or more of the features described above, or as an alternative, further embodiments of the refrigeration unit may include that the movable directional element is one of pivotable, translatable, slideable, or rotatable.

According to another embodiment, a method of installing a refrigeration unit into a vehicle is provided. The method includes installing a refrigeration unit having a movable directional element through an opening in a vehicle, and deploying the movable directional element from a first position to second position, wherein in the first position, the movable directional element is stowed within an evaporator of the refrigeration unit and in the second position the movable directional element provides directional airflow control to air being blown by a fan of the evaporator.

In addition to one or more of the features described above, or as an alternative, further embodiments of the method may include that the movable directional element includes the fan of the evaporator.

In addition to one or more of the features described above, or as an alternative, further embodiments of the method may include a pivot configured to enable the movable directional element to pivot from the first position to the second position.

In addition to one or more of the features described above, or as an alternative, further embodiments of the method may include a support operationally connected to the movable directional element, the method further comprising operating the support to support the movable directional element in the second position.

In addition to one or more of the features described above, or as an alternative, further embodiments of the method may include a fastener, the method further comprising removably attaching the movable directional element in the second position to a structure of the vehicle with the fastener.

In addition to one or more of the features described above, or as an alternative, further embodiments of the method may include that the movable directional element defines a directional surface configured to direct air in a predefined direction.

In addition to one or more of the features described above, or as an alternative, further embodiments of the method may include an additional fan within the evaporator.

In addition to one or more of the features described above, or as an alternative, further embodiments of the method may include installing an attachment device to the evaporator to direct airflow from the evaporator into the cargo space.

In addition to one or more of the features described above, or as an alternative, further embodiments of the method may include that the attachment device includes at least one of a directional surface and a duct.

In addition to one or more of the features described above, or as an alternative, further embodiments of the method may include that the movable directional element is one of pivotable, translatable, slideable, or rotatable.

Technical effects of embodiments of the present disclosure include a refrigeration unit for a vehicle having a movable directional element that is stowable within the refrigeration unit and deployable to provide airflow direction once installed.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1A:
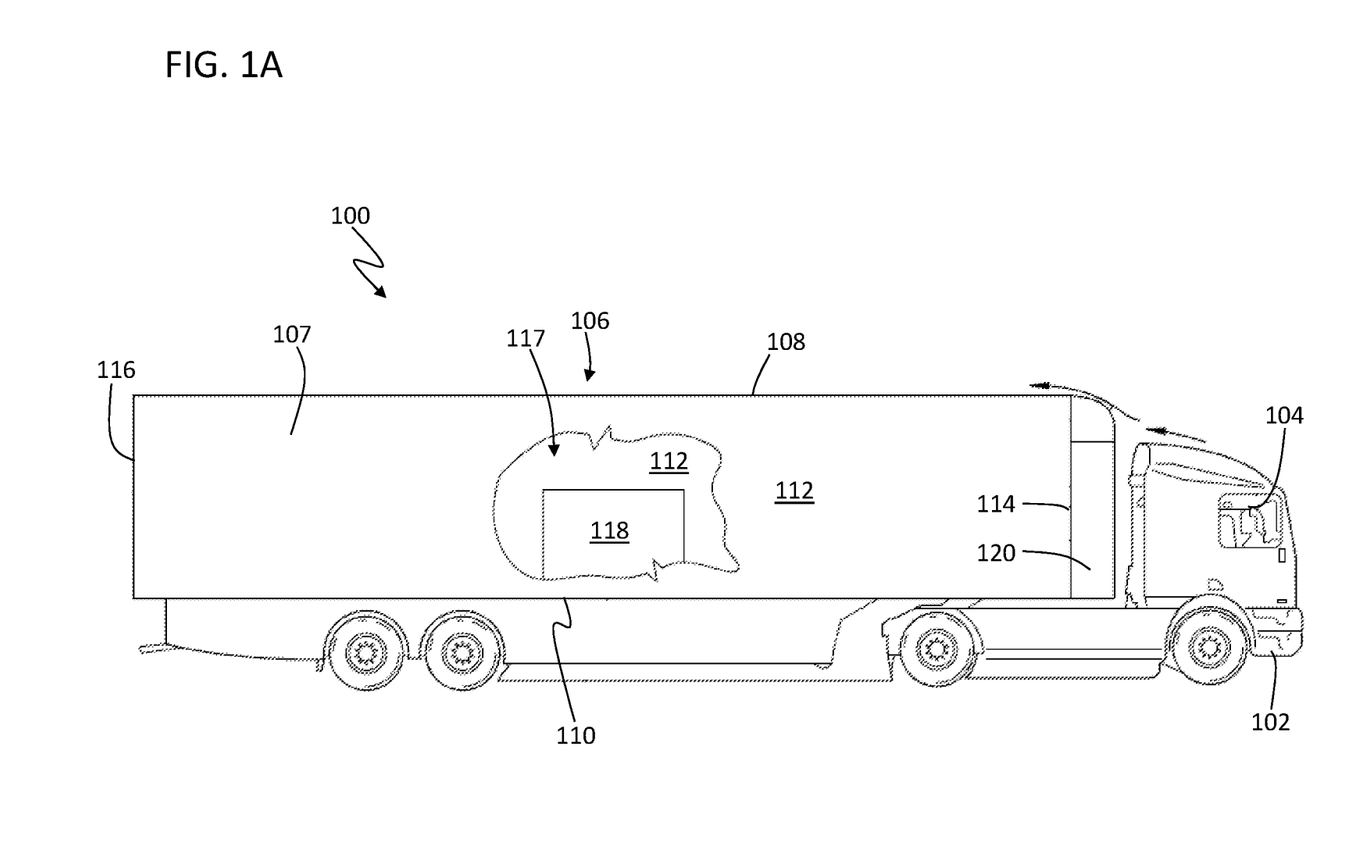
FIG. 1A is a schematic view of an exemplary embodiment of a trailer system including a container having a refrigeration unit and a cargo compartment.

Shown in FIG. 1A is a schematic of an embodiment of a trailer system 100 having a container system 106 as part of a trailer. The trailer system 100 includes a tractor 102 including an operator's compartment or cab 104 and also including an engine, which acts as the drive system of the trailer system 100. A container system 106 is coupled to the tractor 102. The container system 106 is a refrigerated trailer and includes a top wall 108, a directly opposed bottom wall 110, opposed side walls 112, and a front wall 114, with the front wall 114 being closest to the tractor 102, the walls 108, 110, 112, 114 defining a container 107. The container 107 further includes a door or doors (not shown) at a rear wall 116, opposite the front wall 114. The walls of the container 107 define a cargo space 117. The container 107 is configured to maintain a cargo 118 located inside the cargo space at a selected temperature through the use of a refrigeration unit 120 located on or next to the container 107. The refrigeration unit 120, as shown in FIG. 1A, is located at or attached to the front wall 114.

Figure 1B:
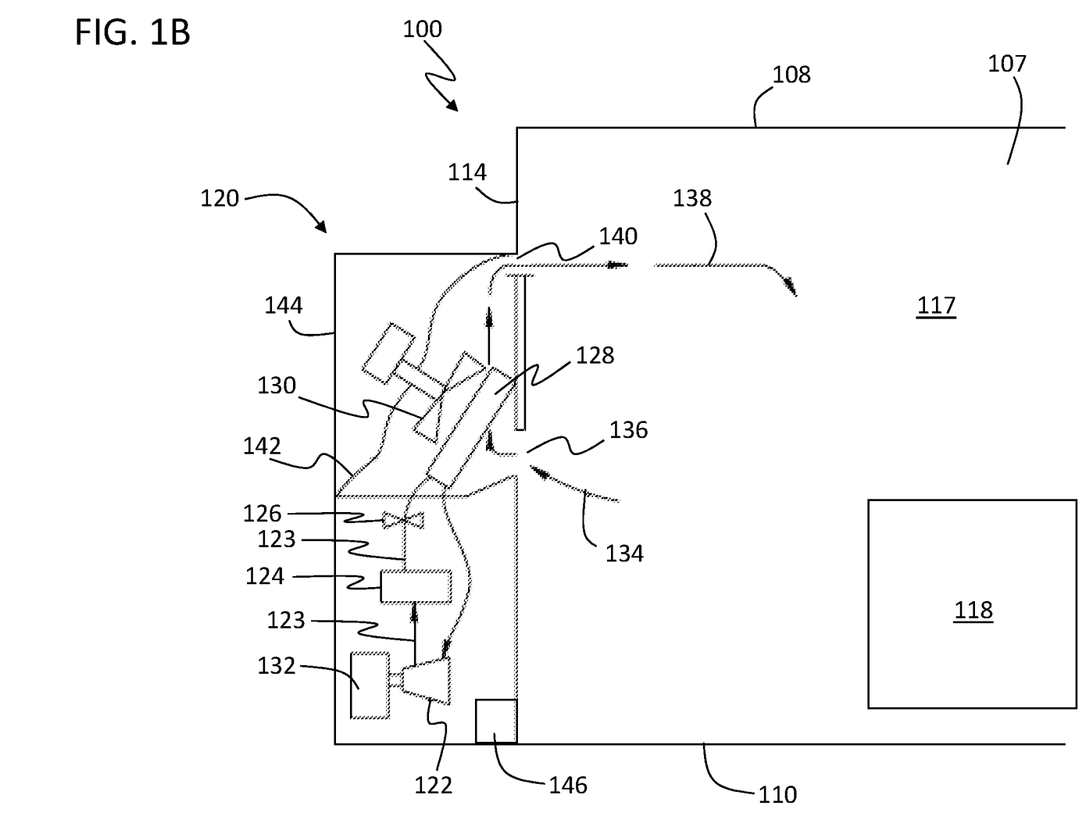
FIG. 1B is a schematic view of an exemplary embodiment of a refrigeration unit for a cargo compartment of the container of FIG. 1A.

Referring now to FIG. 1B, the refrigeration unit 120 is shown in more detail. The refrigeration unit 120 includes a compressor 122, a condenser 124, an expansion valve 126, an evaporator 128, and an evaporator fan 130. The compressor 122 is operably connected to a refrigeration engine 132 which drives the compressor 122. The refrigeration engine 132 is connected to the compressor in one of several ways, such as a direct shaft drive, a belt drive, one or more clutches, and/or via an electrical generator. A refrigerant line 123 fluidly connects the components of the refrigeration unit 120.

Airflow is circulated into and through the cargo space 117 of the container 107 by means of the refrigeration unit 120. A return airflow 134 flows into the refrigeration unit 120 from the cargo space 117 of the container 107 through a refrigeration unit inlet 136, and across the evaporator 128 via the evaporator fan 130, thus cooling the return airflow 134 to a selected or predetermined temperature. The cooled return airflow 134, now referred to as supply airflow 138, is supplied into the cargo space 117 of the container 107 through a refrigeration unit outlet 140, which in some embodiments is located near the top wall 108 of the container 107. The supply airflow 138 cools the cargo 118 in the cargo space 117 of the container 107. It is to be appreciated that the refrigeration unit 120 can further be operated in reverse to warm the container 107 when, for example, the outside temperature is very low.

The refrigeration unit 120 is positioned in a frame 142 and contained in an accessible housing 144, with the frame 142 and/or the housing 144 secured to an exterior side of the front wall 114 such that the refrigeration unit 120 is positioned between the front wall 114 and the tractor 102, as shown in FIG. 1A.

The refrigeration unit 120 includes a power connector 146. Power connector 146 may be configured to receive a plug or other wired connection to supply electrical power to the refrigeration unit 120. When the container system 100 is located at a port, loaded on a ship, attached to a tractor, etc., a power supply (not shown) may be connected to the power connector 146. When the container 107 is moved from one location to another, the power connector 146 may be required to be disconnected from a power source such that the container 107 is not physically connected to or wired to a power source, enabling freedom of movement of the container 107. In some embodiments the power source include, but is not limited to, grid power, engine supplied power, auxiliary power unit power, etc.

When the power connector 146 is disconnected from a power source, the refrigeration unit 120 may not be able to be operated to continuously supply conditioned air within the cargo space 117 of the container 107. If the power supply is absent for too long of a period, the temperature within the cargo space 117 of the container 107 may change sufficiently to become detrimental to any cargo within the cargo space 117. For example, if the refrigeration unit 120 is not operated within a predetermined time period, the air temperature within the cargo space 117 of the container 107 may rise to levels that are above desired temperatures for a specific cargo within the container 107.

It will be appreciated by those of skill in the art that the systems and configurations of FIGS. 1A and 1B are merely exemplary and provided for illustrative and descriptive purposes only. The disclosure is not limited thereby. For example, although a tractor-trailer configuration is shown, systems may be employed in other container configurations, in various truck configurations, and/or in other systems and configurations. Further, as will be appreciated by those of skill in the art, the container and cargo space may be configured as a sea container, and thus may be configured to stack with other containers and be shipped on a shipping vessel.

Figure 2:
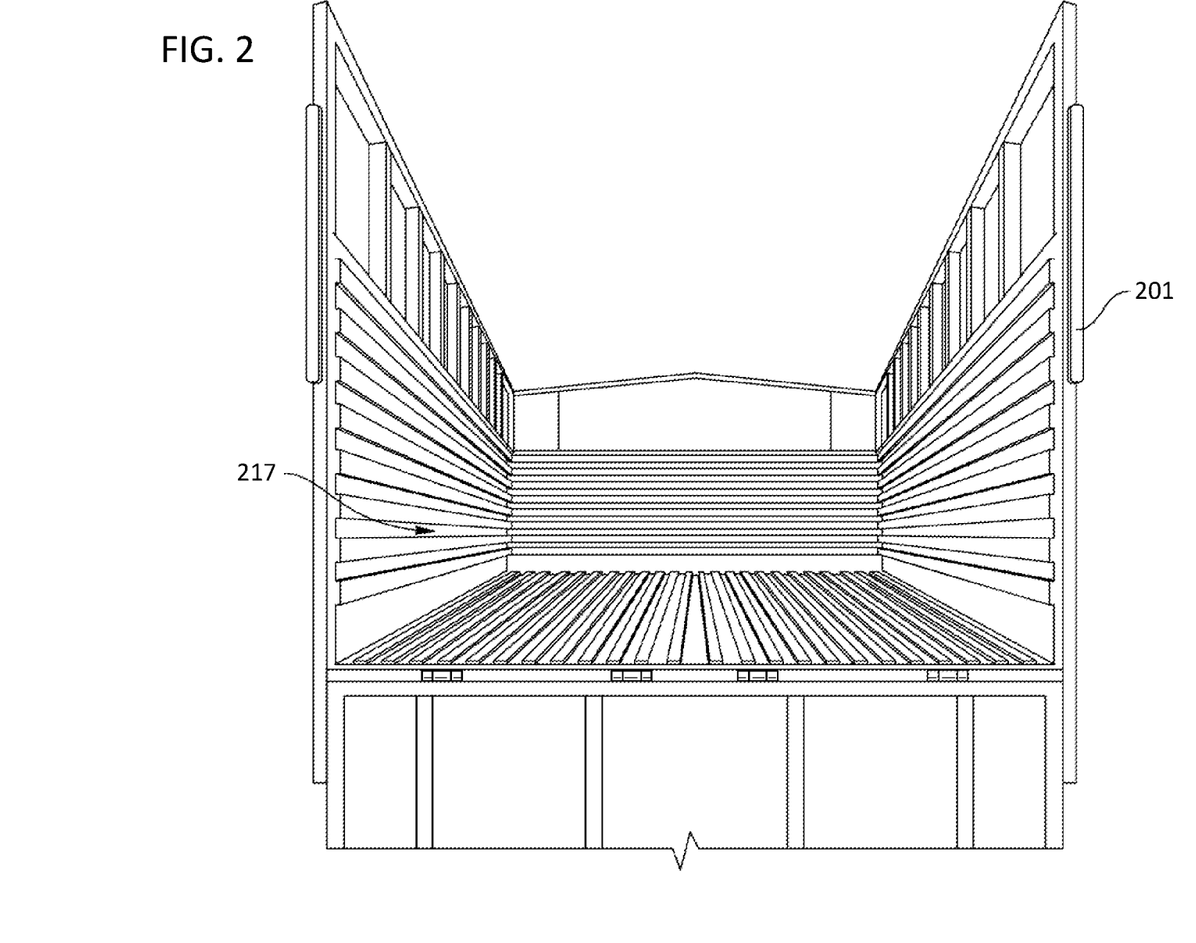
FIG. 2 is a schematic illustration of a vehicle without a tarp cover that may employ various embodiments disclosed herein.

FIG. 2 is a schematic illustration of a vehicle 201 having an open bed or cargo space 217, such as a tarp-covered truck. The vehicle 201 cannot employ a fixed or rigid refrigeration unit because any cooling would be lost due to the open air of the cargo space 217. Even when a cover, such as a tarp, is configured over the cargo space 217, the leakage of any cooling would be sufficient to negate the cooling. However, using a semi-rigid cover (or even a tarp) a refrigeration unit can be mounted on the vehicle 201 to provide cooling to the cargo space.

However, when a refrigeration unit is installed in the front wall of a vehicle 201, the evaporator air flow is not ducted properly near the ceiling of the cargo area 217. Such lack of ducting can lead to poor air throw and thus poor and/or ineffective cooling in the cargo space. Accordingly, it may be advantageous to have a refrigeration unit that is able to be installed in a vehicle (e.g., vehicle 201) that provides improves air throw and cooling flow within the cargo space 217.

Figure 3A:
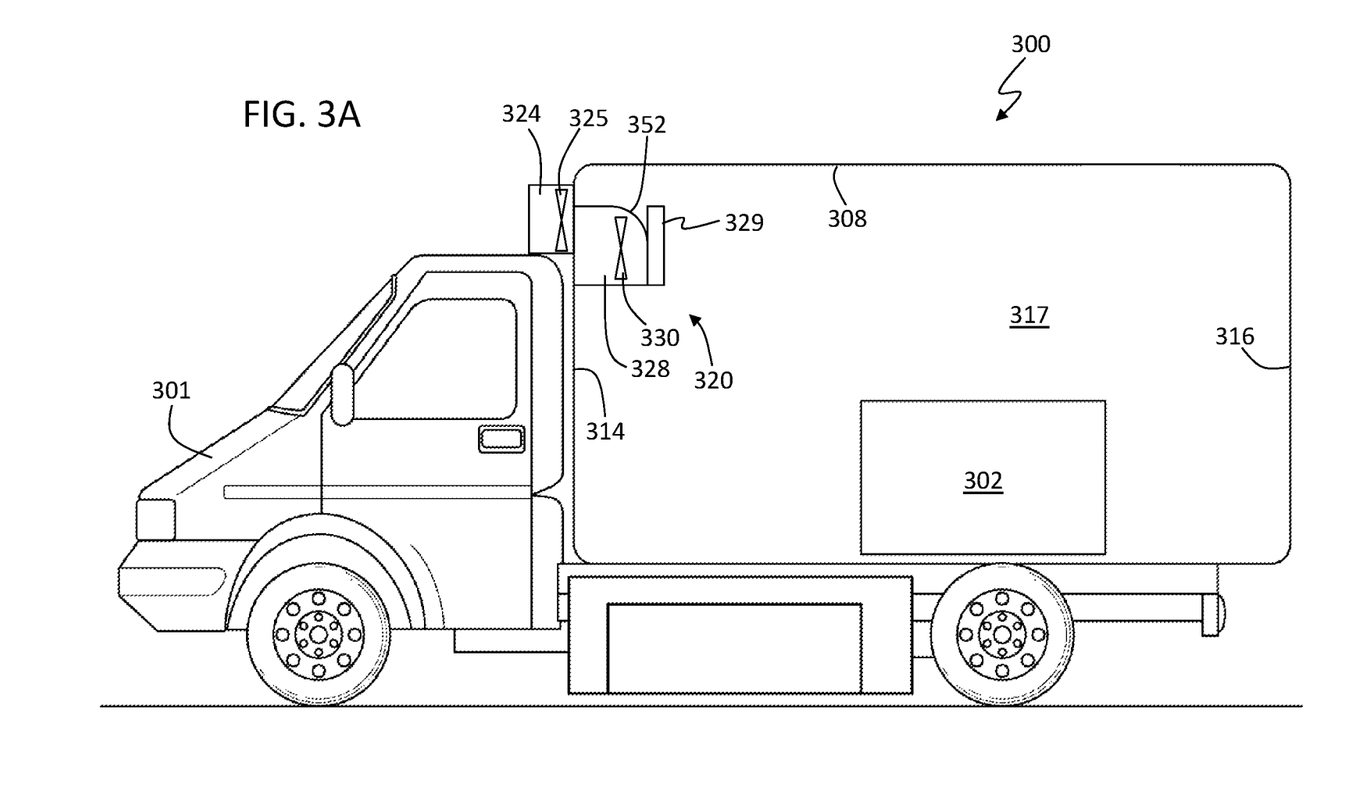
FIG. 3A is a schematic illustration of a vehicle having a refrigeration unit in accordance with an embodiment of the present disclosure in a first position.
Figure 3B:
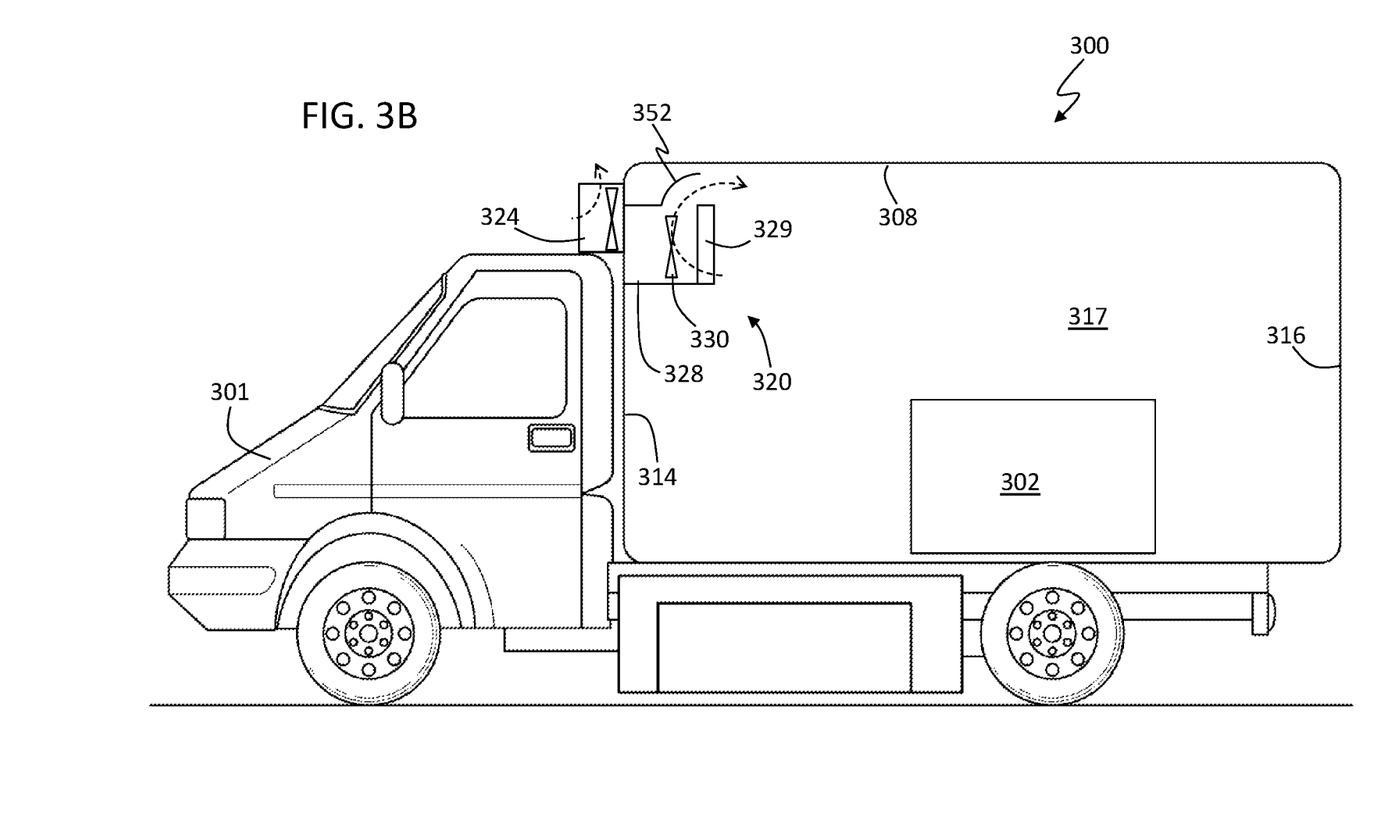
FIG. 3B is a schematic illustration of the vehicle and refrigeration unit of FIG. 3A in a second position.

Turning now to FIGS. 3A-3B, a vehicle 300 having a refrigeration unit 320 in accordance with a non-limiting embodiment of the present disclosure is shown. The vehicle 300 includes a cargo space 317 for holding cargo 302 that is covered or enclosed with a cover 350. Located on top of a cab 304 and within the cargo space 317 is a refrigeration unit 320. The refrigeration unit 320 can includes compressors, heat exchangers, fans, condensers, expansion devices, etc., as known in the art. For example, as shown, the refrigeration unit 320 includes a condenser 324 with a condenser fan 325 located on top of the cab 304. The condenser 324 is in fluid and/or thermal communication with an evaporator 328 having an evaporator coil 329 and an evaporator fan 330. As shown, and in some embodiments, the condenser 324 is configured exterior to a front wall 314 and the evaporator 328 is configured on the interior of the front wall 314 and within the cargo space 317. The evaporator fan 330, in some embodiments, is configured as a blower wheel that is configured to blow air upward toward a top wall 308 of the vehicle 300.

The refrigeration unit 320 includes a movable directional element 352. The movable directional element 352, in the non-limiting embodiment of FIGS. 3A-3B, is a panel or chute that is moveable from a first position (FIG. 3A) to a second position (FIG. 3B). As shown in FIG. 3A, the refrigeration unit 320 is in a first state, such as an installation state, and the movable directional element 352 is in the first position. The first position can be a stowed or storage position. As such, in the first position, the movable directional element 352 is housed within the refrigeration unit 320 and enables the refrigeration unit 320 to be installed into the vehicle 300. The movable directional element, as provided herein, can be pivotable, translatable, slideable, rotatable, or otherwise movable from the first position to the second position.

In the embodiment of FIGS. 3A-3B, the movable directional element 352 consists of an unfolding directional air chute that allows the refrigeration unit 320 to be installed into a standard opening in the front wall 314. Once the refrigeration unit 320 is installed, the movable directional element 352 is then unfolded into a second position via a hinge arrangement. When the movable directional element 352 is deployed or arranged in the second position, the movable directional element 352 will direct evaporator air along the top wall 308 of the cargo space 317, thus providing good air throw toward the rear wall 316.

For example, as shown in FIG. 3B, the movable directional element 352 is in the second position. The second position is a position of the movable directional element 352 that is open and enables airflow to be pulled through the evaporator coil 329 and driven by the evaporator fan 330. The interior, cool airflow is shown in the dashed curve through the evaporator 328. Similarly, condenser air is indicated as flowing through the condenser 324. The two air flows are fluidly and/or thermally in communication with each other to enable cooling of the air within the cargo space 317.

As shown, in the second position, the movable directional element 352 defines a contoured or directional surface that directs airflow rearward within the cargo space 317. That is, without the movable directional element 352, the air would be blow directly upward and normal to the top wall 308. In such a configuration, there may be poor air circulation and/or cooling toward the rear wall 316. However, the movable directional element 352 is configured to enable directional airflow to maximize cooling within the cargo space 317.

After use, if a user wishes to move the refrigeration unit 320 to another vehicle, the user can close the movable directional element 352 (e.g., move it from the second position to the first position) and then remove the refrigeration unit 320 from the front wall 314 of the vehicle 300.

Figure 4A:
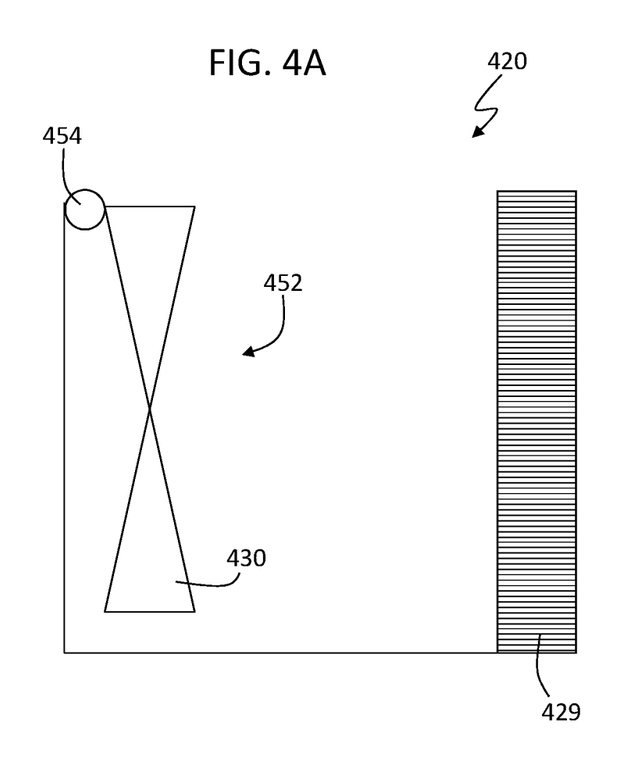
FIG. 4A is a schematic illustration of an alternative configuration of a refrigeration unit in accordance with an embodiment of the present disclosure in a first position.
Figure 4B:
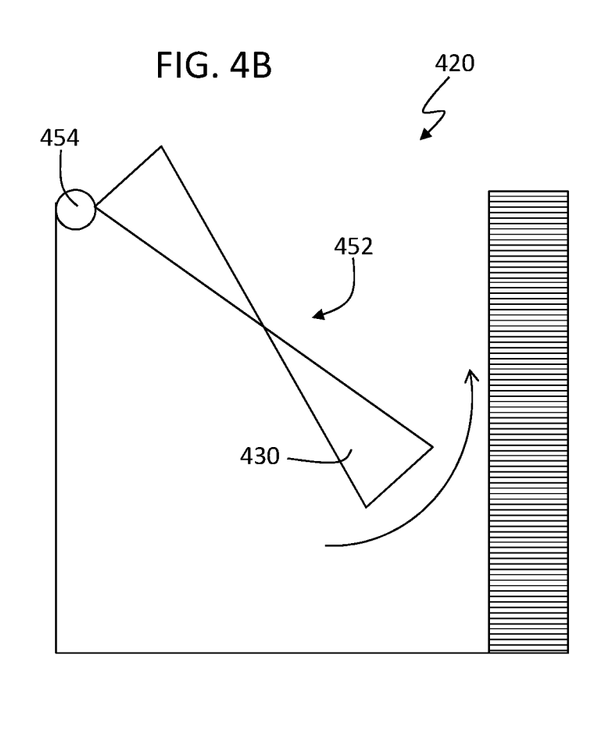
FIG. 4B is a schematic illustration of the refrigeration unit of FIG. 4A showing a transitional position.
Figure 4C:
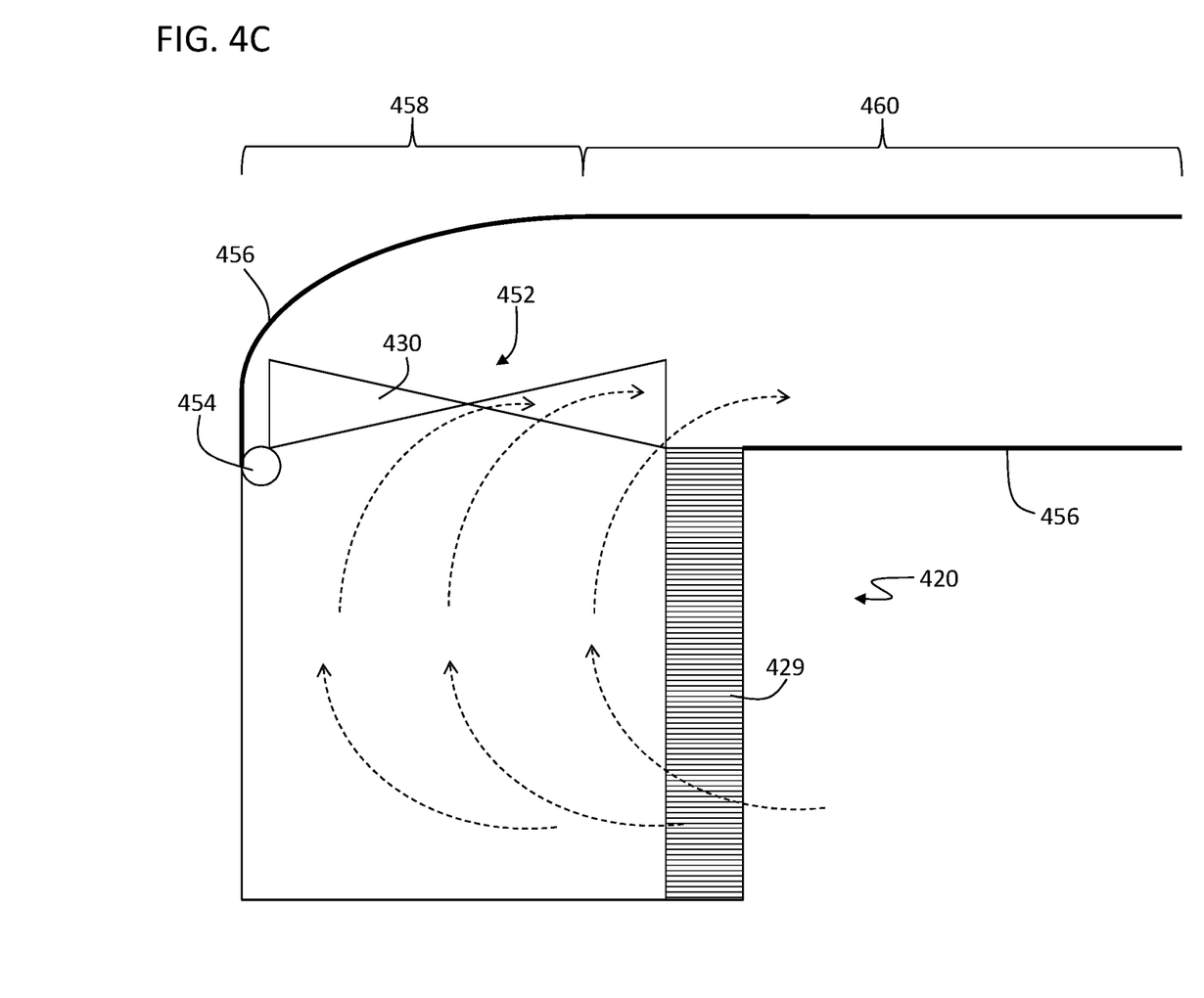
FIG. 4C is a schematic illustration of the refrigeration unit of FIG. 4A in a second position.

Turning now to FIGS. 4A-4C, an alternative configuration of a refrigeration unit in accordance with a non-limiting embodiment. FIG. 4A shows the refrigeration unit 420 in a first state, FIG. 4B shows the refrigeration unit 420 in an intermediate state, and FIG. 4C shows the refrigeration unit 420 in a second state. In FIGS. 4A-4C only the evaporator portion of the refrigeration unit 420 is shown, and those of skill in the art will appreciate that the refrigeration unit 420 can include other components and may include a condenser portion similar to that shown in FIGS. 3A-3B.

As shown in FIG. 4A, the refrigeration unit 420 includes an evaporator coil 429 and an evaporator fan 430. In the embodiment of FIGS. 4A-4C, the evaporator fan 430 is part of the movable directional element 452. That is, the evaporator fan 430 is movable from a first position (FIG. 4A) to a second position (FIG. 4C) and is pivoted about a pivot 454, as shown. During installation of the refrigeration unit 420 into a vehicle, during storage, and/or when otherwise desired, the movable directional element 452 can be stowed in the first position and minimize the profile of the refrigeration unit 420. Then, during installation, the movable directional element 452 can be moved from the first position (FIG. 4A) to the second position (FIG. 4C) as shown in FIG. 4B.

Figure 7A:
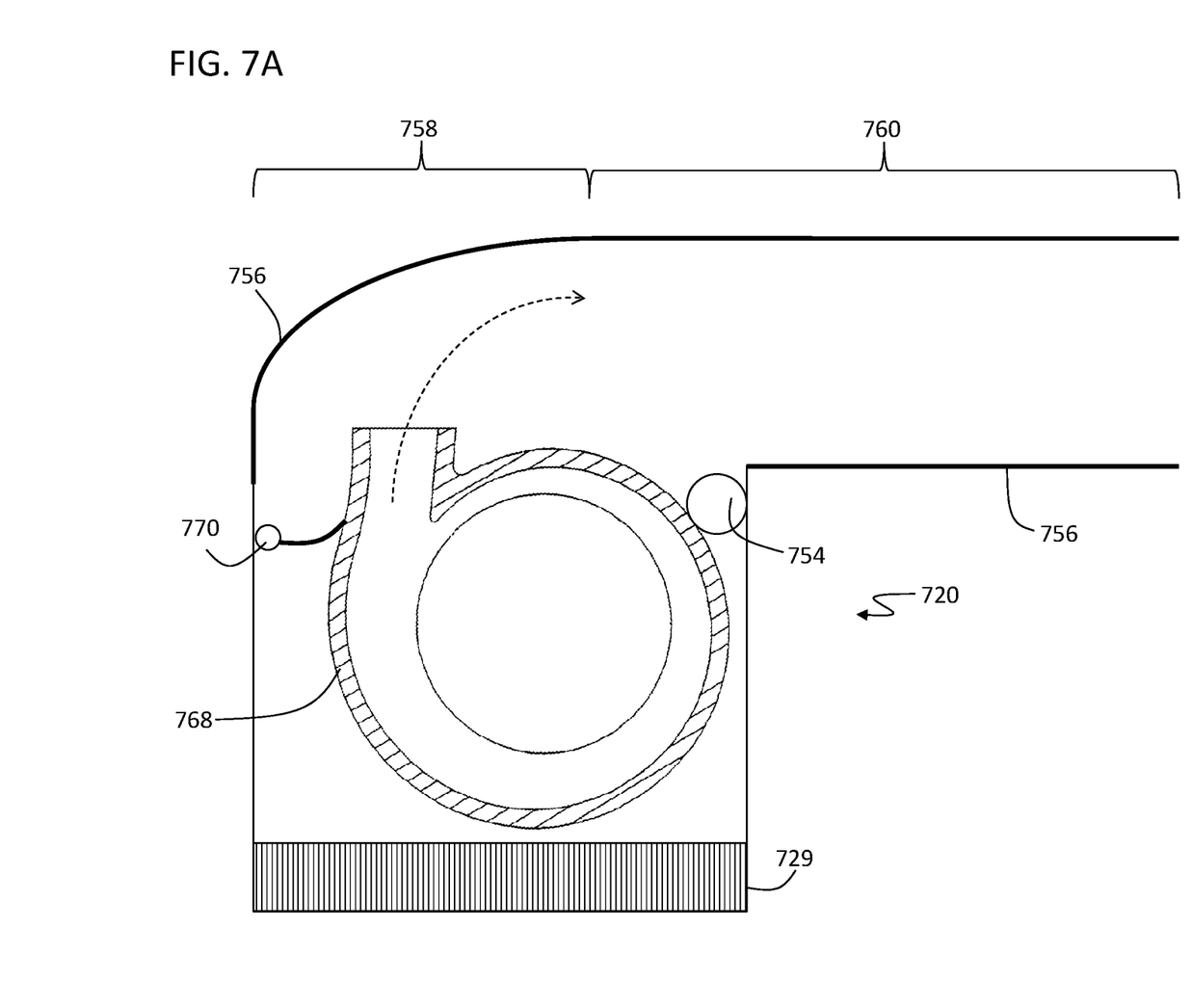
FIG. 7A is a schematic illustration of another alternative configuration of a refrigeration unit in accordance with an embodiment of the present disclosure in a first position.
Figure 7B:
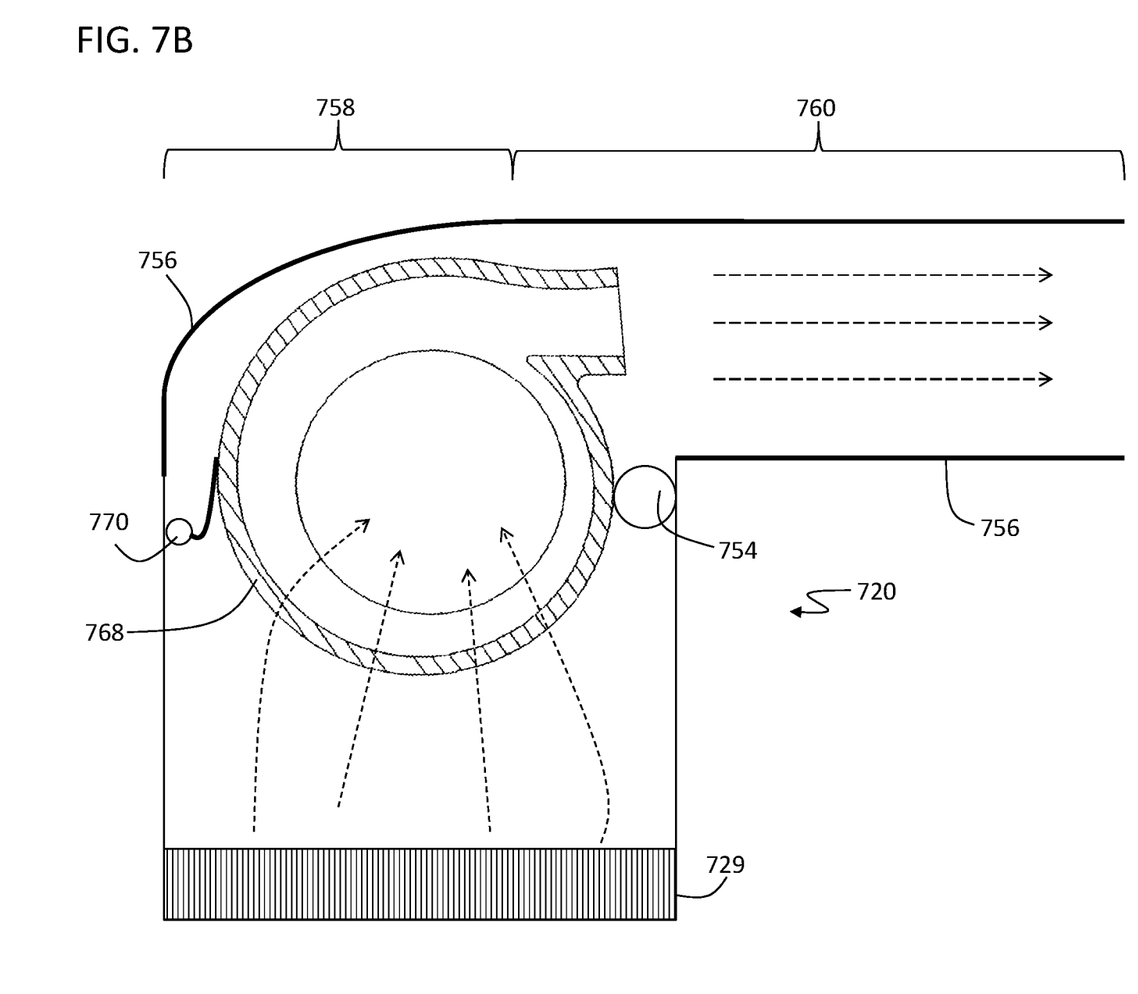
FIG. 7B is a schematic illustration of the refrigeration unit of FIG. 7A in a second position.

FIG. 4C shows the refrigeration unit 420 in the second state, with the movable directional element 452 in the second position. The dashed, curved arrows indicate the airflow through the refrigeration unit 420, with the evaporator fan 430 pulling air through the evaporator coil 429 and then blowing the air back into a storage space. In some embodiments, the evaporator coil can be fixed in an alternate position (e.g., as shown in FIGS. 7A-7B).

Also shown in FIG. 4C is an optional attachment device 456. The optional attachment device 456 can be installed and/or attached to the refrigeration unit 420 after moving the movable directional element 452 from the first position to the second position. The optional attachment device 456 can be a chute or other channel that can include various features that are configured to enable improved airflow and/or airflow direction within a storage space. For example, the optional attachment device 456 can have a curved, directional surface 458 that is configured to aid in directing airflow from the refrigeration unit 420 to a desired location. Further, the optional attachment device 456 can have a duct 460 that is configured to aid in delivering cooled air to a desired location within a storage space (e.g., a rear of the storage space). In some embodiments, the optional attachment device 456 can include additional fans for aiding in blowing air into and throughout a storage space of a vehicle.

Figure 5A:
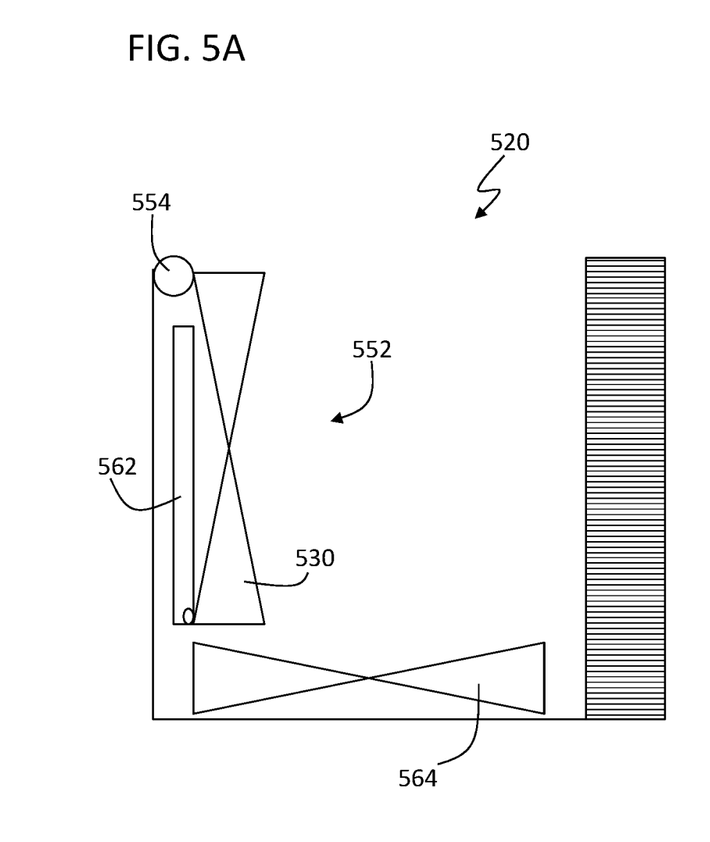
FIG. 5A is a schematic illustration of another alternative configuration of a refrigeration unit in accordance with an embodiment of the present disclosure in a first position.
Figure 5B:
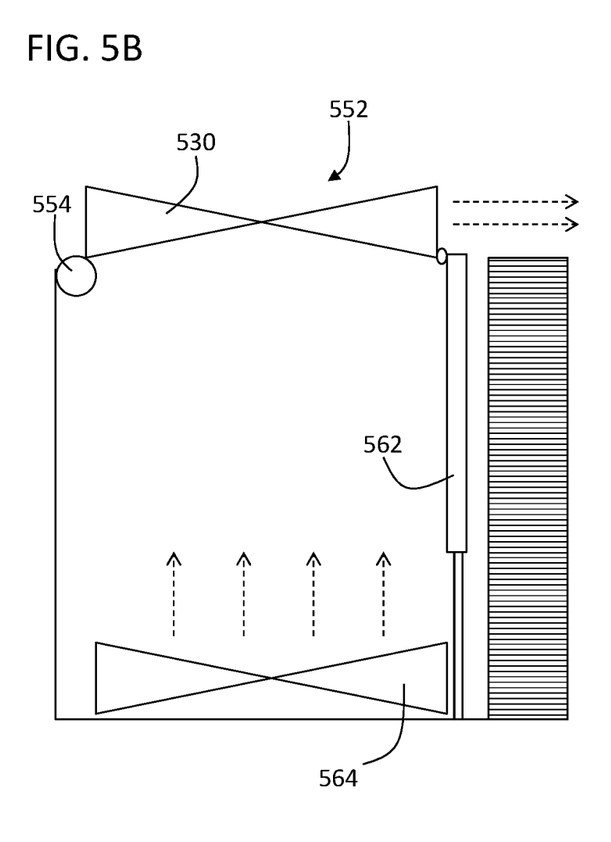
FIG. 5B is a schematic illustration of the refrigeration unit of FIG. 5A in a second position.

Turning now to FIGS. 5A-5B, another non-limiting embodiment in accordance with the present disclosure is shown. A refrigeration unit 520 includes a fan 530 that is similar to the above described evaporator fan of FIGS. 4A-4C. The first fan 530 pivotable about a pivot 554 and is part of a movable directional element 552. As shown, the movable directional element 552 also includes a support 562 that is configured to support and hold the movable directional element 552 in the second position, as shown in FIG. 5B. FIG. 5A shows the movable directional element 552 and support 562 in a first position wherein the movable directional element 552 and support 562 are stowed. In FIG. 5B, the movable directional element 552 is deployed or moved to a second position and the support 562 is extended to hold the movable directional element 552 in the second position.

Additionally, as shown in FIGS. 5A-5B, the refrigeration unit 520 includes an additional fan 564. The additional fan 564 is configured to blow air, as indicated by the vertical dashed arrows, toward the fan 530, and thus improved airflow may be achieved. Those of skill in the art will appreciate that any number of fans and/or blowers can be used without departing from the scope of the present disclosure.

Figure 6:
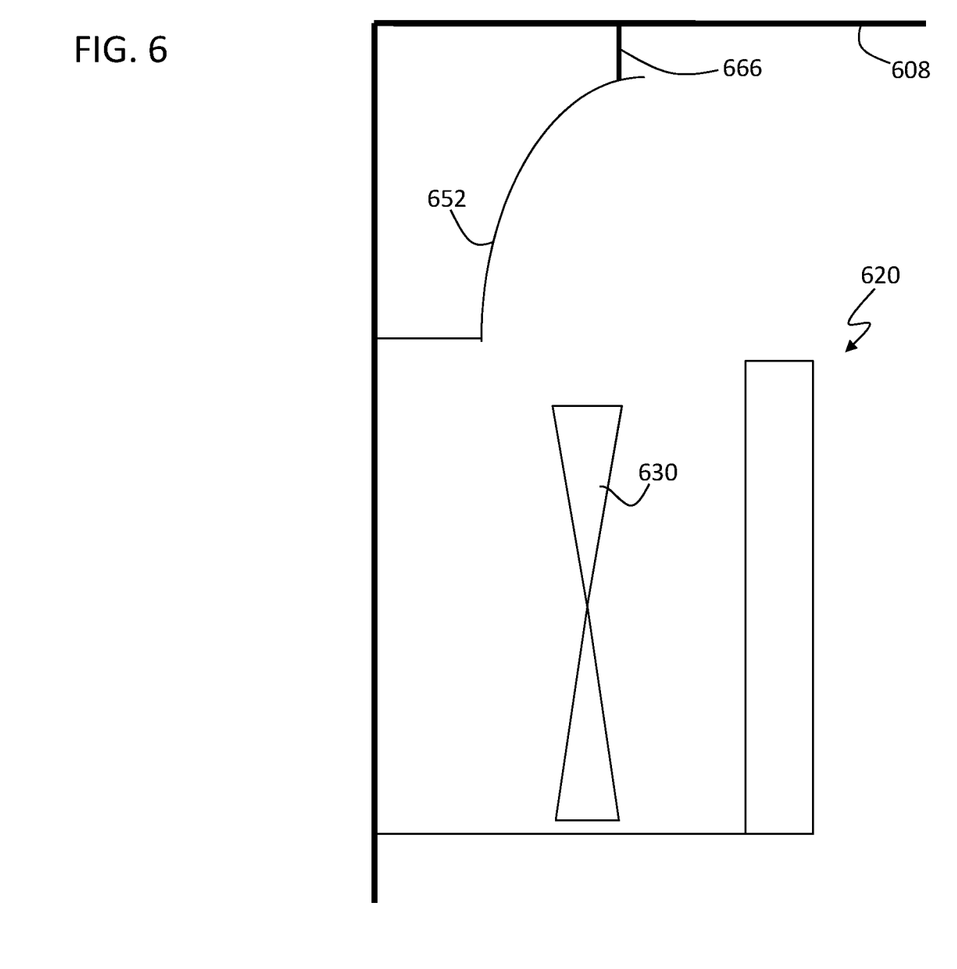
FIG. 6 is a schematic illustration of another alternative configuration of a refrigeration unit in accordance with an embodiment of the present disclosure.

Turning now to FIG. 6, another non-limiting embodiment of the present disclosure is shown. In FIG. 6, a refrigeration unit 620 includes a movable directional element 652 similar to that shown and described with respect to FIGS. 3A-4B, defining a directional surface with an evaporator fan 630 within the refrigeration unit 620. As shown, the movable directional element 652 is maintained in the second position by a fastener 666. The fastener 666 is configured to releasably attach the movable directional element 652 to a surface of the vehicle, such as the top wall 608, although the fastener 666 can attach the movable directional element to the front wall or to some other structure of the vehicle. The fastener 666 can be any type of fastener or other device to hold the movable directional element 652 in the second position, including but not limited to, screws, bolts, nails, adhesives, hook-and-loop connectors, wire connectors, etc.

Turning now to FIGS. 7A-7B, another configuration in accordance with the present disclosure is shown. FIG. 7A shows a centrifugal fan/motor device 768 of a refrigeration unit 720 in a first (storage) position (FIG. 7A) and in an second (operational) position (FIG. 7B). An optional attachment device 756 is shown installed and/or attached to the refrigeration unit 720. The optional attachment device 756 can be installed after pivoting the centrifugal fan/motor device 768 about a pivot 754 from the first position to the second position. In other configurations, a lever or other mechanical and/or electrical mechanism can be used to rotate or pivot the centrifugal fan/motor device 768 within the refrigeration unit 720 and/or the optional attachment device 756.

The optional attachment device 756 can be a chute or other channel that can include various features that are configured to enable improved airflow and/or airflow direction within a storage space. For example, the optional attachment device 756 can have a curved, directional surface 758 that is configured to aid in directing airflow from the refrigeration unit 720 to a desired location. Further, the optional attachment device 756 can have a duct 760 that is configured to aid in delivering cooled air to a desired location within a storage space (e.g., a rear of the storage space). In some embodiments, the optional attachment device 756 can include additional fans for aiding in blowing air into and throughout a storage space of a vehicle.

Also shown in FIGS. 7A-7B, the refrigeration unit 720 can include a seal device 770. The seal device 770 can be configured to prevent air loss within or through the refrigeration unit 720. As shown, the seal device 770 provides a contact with an exterior surface of the centrifugal fan/motor device 768 such that when the centrifugal fan/motor device 768 is pivoted from the first position to the second position, air can be directed or contained within the refrigeration unit 720 and thus be blown through the centrifugal fan/motor device 768. Further, as shown in the configuration of FIGS. 7A-7B, an evaporator coil 729 is positioned below the centrifugal fan/motor device 768.

Figure 8:
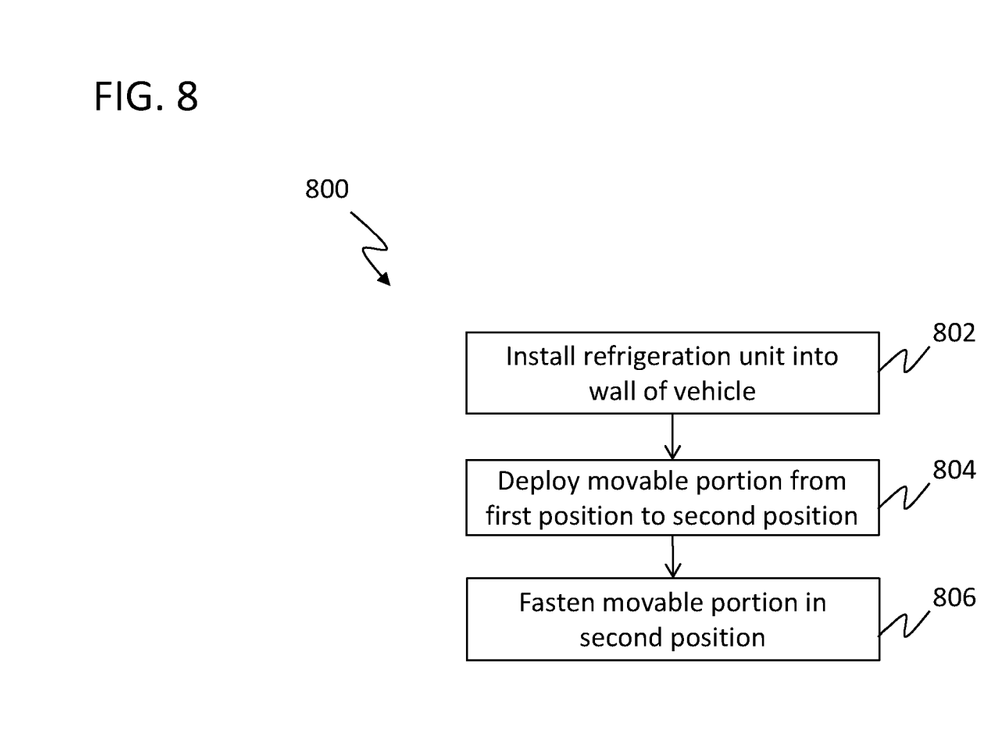
FIG. 8 is a flow process for installing a refrigeration unit in accordance with an embodiment of the present disclosure.

Turning now to FIG. 8, a flow process for installing a refrigeration unit in a vehicle in accordance with an embodiment of the present disclosure is shown. Flow process 800 may be used with any of the above described embodiments and/or variations thereon. At block 802 the refrigeration unit is installed into a wall of the vehicle. For example, a portion of the refrigeration unit can be passed through a hole or other opening in a wall of the vehicle such that an evaporator portion is within a cargo space and a condenser portion is outside of the cargo space.

At block 804, a movable directional element of the refrigeration unit is deployed from a first position (e.g., stowed) to a second position (e.g., deployed). The movable directional element can be configured similar to that shown and described above. For example, in some embodiments, the movable directional element can be a directional panel or surface that in a first position is housed within the refrigeration unit and in a second position is configured to extend out of the refrigeration unit and direct air in a specific direction. The directional panel can be curved such that when air is blow toward the directional panel, the air is redirected. In some embodiments, the movable directional element may include a fan or blower. At block 806, the movable directional element can be fixed into the second position by operation of an optional support, which may be a fastener, such as shown and described above. The refrigeration unit can then be operated to provide cool air within a cargo space and the air can be blown efficiently toward the back of the cargo space.

When uninstalling, the opposite of flow process 800 can be performed. For example, the movable directional element can be released by undoing or releasing the support or fastener and then moving the movable directional element from the second position to the first position. In the first position, the movable directional element can be stowed, enabling easy removal of the refrigeration from the vehicle.

Advantageously, embodiments described herein provide a refrigeration unit for a vehicle that is relatively easy to install and provide improved airflow by having a movable directional element that is configured to direct airflow from the refrigeration unit. The movable directional element of the refrigeration unit can provide improved cooling and/or air circulation within a cargo space. Further, because the movable directional element can be stowed within the refrigeration unit and then deployed to an operational position, installation time and/or labor can be reduced.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

For example, although described herein with respect to trucks, those of skill in the art will appreciate that refrigeration units as described herein may be employed in other vehicles, such as boats and/or aircraft. Moreover, the refrigeration units described herein may be able to be completely removed from a vehicle, such that cooling may be provided to a cargo that is removed from the vehicle. That is, the refrigeration unit may be removed from the vehicle and may be moved with a cargo to continuously provide cooling to the cargo.

Further, for example, although one relative size is shown in the accompanying drawings, those of skill in the art will appreciate that refrigeration units described herein may be scalable, such that a small, autonomous unit may be made without departing from the scope of the disclosure. Thus, the drawings are merely provided for illustrative and explanatory purposes and are not intended to be limiting.

Accordingly, the present disclosure is not to be seen as limited by the foregoing description, but is only limited by the scope of the appended claims.

What is claimed is:

1. A refrigeration unit for a vehicle comprising:
    a condenser configured to be positioned outside of the vehicle;
    an evaporator in thermal communication with the condenser and configured to be positioned inside of a cargo space of the vehicle, the evaporator having a fan; and
    a movable directional element housed within the evaporator and deployable from a first position to a second position, wherein in the first position, the movable directional element is stowed within the evaporator and in the second position the movable directional element provides directional airflow control to air being blown by the fan of the evaporator,
    wherein the movable directional element defines a directional surface configured to direct air in a predefined direction.

2. The refrigeration unit of claim 1, wherein the movable directional element includes the fan of the evaporator.

3. The refrigeration unit of claim 1, further comprising a pivot configured to enable the movable directional element to pivot from the first position to the second position.

4. The refrigeration unit of claim 1, further comprising a support operationally connected to the movable directional element, the support configured to releasably support the movable directional element in the second position.

5. The refrigeration unit of claim 1, further comprising a fastener configured to removably attach the movable directional element in the second position to a structure of the vehicle.

6. The refrigeration unit of claim 1, further comprising an additional fan within the evaporator.

7. The refrigeration unit of claim 1, further comprising an attachment device configured to attach to the evaporator and direct airflow from the evaporator into the cargo space.

8. The refrigeration unit of claim 7, wherein the attachment device includes at least one of a directional surface and a duct.

9. The refrigeration unit of claim 1, wherein the movable directional element is one of pivotable, translatable, slidable, or rotatable.

10. A method of installing a refrigeration unit into a vehicle, the method comprising: installing a refrigeration unit having a movable directional element through an opening in a vehicle; and
    deploying the movable directional element from a first position to second position, wherein in the first position, the movable directional element is stowed within an evaporator of the refrigeration unit and in the second position the movable directional element provides directional airflow control to air being blown by a fan of the evaporator,
    wherein the movable directional element defines a directional surface configured to direct air in a predefined direction.

11. The method of claim 10, wherein the movable directional element includes the fan of the evaporator.

12. The method of claim 10, further comprising a pivot configured to enable the movable directional element to pivot from the first position to the second position.

13. The method of claim 10, further comprising a support operationally connected to the movable directional element, the method further comprising operating the support to support the movable directional element in the second position.

14. The method of claim 10, further comprising a fastener, the method further comprising removably attaching the movable directional element in the second position to a structure of the vehicle with the fastener.

15. The method of claim 10, further comprising an additional fan within the evaporator.

16. The method of claim 10, further comprising installing an attachment device to the evaporator to direct airflow from the evaporator into the cargo space.

17. The method of claim 16, wherein the attachment device includes at least one of a directional surface and a duct.

18. The method of claim 10, wherein the movable directional element is one of pivotable, translatable, slidable, or rotatable.

19. A refrigeration unit for a vehicle comprising:
- a condenser configured to be positioned outside of the vehicle;
- an evaporator in thermal communication with the condenser and configured to be positioned inside of a cargo space of the vehicle, the evaporator having a fan;
- a movable directional element housed within the evaporator and deployable from a first position to a second position, wherein in the first position, the movable directional element is stowed within the evaporator and in the second position the movable directional element provides directional airflow control to air being blown by the fan of the evaporator; and
- a fastener configured to removably attach the movable directional element in the second position to a structure of the vehicle.

20. The refrigeration unit of claim 19, wherein the movable directional element is one of pivotable, translatable, slidable, or rotatable.

* * * * *